United States Patent
Acevedo et al.

(10) Patent No.: US 10,702,067 B2
(45) Date of Patent: Jul. 7, 2020

(54) SMART PHONE HOLDING ASSEMBLY

(71) Applicants: Angel Acevedo, Kannapolis, NC (US); Christina Echevarria, Kannapolis, NC (US)

(72) Inventors: Angel Acevedo, Kannapolis, NC (US); Christina Echevarria, Kannapolis, NC (US)

( * ) Notice: Subject to any disclaimer, the term of this patent is extended or adjusted under 35 U.S.C. 154(b) by 0 days.

(21) Appl. No.: 16/169,282

(22) Filed: Oct. 24, 2018

(65) Prior Publication Data

US 2020/0128962 A1 Apr. 30, 2020

(51) Int. Cl.
| | | |
|---|---|---|
| *A47C 1/11* | (2006.01) | |
| *A47C 7/62* | (2006.01) | |
| *F16M 13/02* | (2006.01) | |
| *F16B 2/12* | (2006.01) | |

(52) U.S. Cl.
CPC .................. *A47C 1/11* (2013.01); *A47C 7/62* (2013.01); *F16B 2/12* (2013.01); *F16M 13/022* (2013.01); *F16M 2200/024* (2013.01); *F16M 2200/06* (2013.01)

(58) Field of Classification Search
CPC ... A47C 1/11; A47C 7/62; A47C 7/624; F16B 2/12; F16M 13/022; F16M 2200/024; F16M 2200/06
USPC ..................................................... 297/188.18
See application file for complete search history.

(56) References Cited

U.S. PATENT DOCUMENTS

| | | | |
|---|---|---|---|
| 4,796,162 A * | 1/1989 | Krogsrud ............... | F16M 11/10 362/253 |
| 6,896,230 B2 | 5/2005 | Cvek | |
| 7,922,137 B2 * | 4/2011 | Derry .................. | A47B 21/0314 248/178.1 |
| D654,503 S | 2/2012 | Sapper | |
| 8,469,323 B1 * | 6/2013 | Deros .................. | F16M 11/105 248/123.11 |
| 8,636,257 B2 * | 1/2014 | Tsou ....................... | B60R 11/02 248/121 |
| 8,931,748 B2 | 1/2015 | Bowman | |
| 9,133,982 B1 | 9/2015 | Valdez | |
| 9,565,930 B2 | 2/2017 | Gwag | |
| 9,709,217 B2 * | 7/2017 | Trinh ................... | F16M 13/022 |
| 9,809,174 B1 * | 11/2017 | Torres ..................... | A47C 1/11 |
| 2005/0006542 A1 | 1/2005 | Henning | |
| 2008/0073946 A1 * | 3/2008 | Maione .................... | A47C 7/70 297/161 |
| 2008/0164395 A1 * | 7/2008 | Chang .................. | F16M 11/105 248/276.1 |

(Continued)

FOREIGN PATENT DOCUMENTS

WO WO2011154703 12/2011

*Primary Examiner* — Mark R Wendell

(57) ABSTRACT

A smart phone holding assembly for mooting an electronic device to a barber chair a haircut includes a barber chair that has an armrest. A first arm is releasably coupled to the armrest and an articulating joint is coupled to the first arm. A second arm is coupled to the articulating joint such that the second arm is positionable at a selected angle with respect to the first arm. A clamp is pivotally coupled to the second arm such that the clamp is positionable at a selected angle with respect to the second arm. The clamp releasably engages an electronic device to retain the electronic device at eye level with a customer is seated in the barber chair.

8 Claims, 5 Drawing Sheets

(56) References Cited

U.S. PATENT DOCUMENTS

2014/0252812 A1\* 9/2014 Ton .................. A47C 1/11
   297/170
2017/0328512 A1\* 11/2017 Brown .............. F16M 11/041

\* cited by examiner

SMART PHONE HOLDING ASSEMBLY

CROSS-REFERENCE TO RELATED APPLICATIONS

N/A

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to articulated holding devices and more particularly pertains to a new articulated holding device for mounting an electronic device to a barber chair.

BRIEF SUMMARY OF THE INVENTION

An embodiment of the disclosure meets the needs presented above by generally comprising a barber chair that has an armrest. A first arm is releasably coupled to the armrest and an articulating joint is coupled to the first arm. A second arm is coupled to the articulating joint such that the second arm is positionable at a selected angle with respect to the first arm. A clamp is pivotally coupled to the second arm such that the clamp is positionable at a selected angle with respect to the second arm. The clamp releasably engages an electronic device to retain the electronic device at eye level with a customer is seated in the barber chair.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
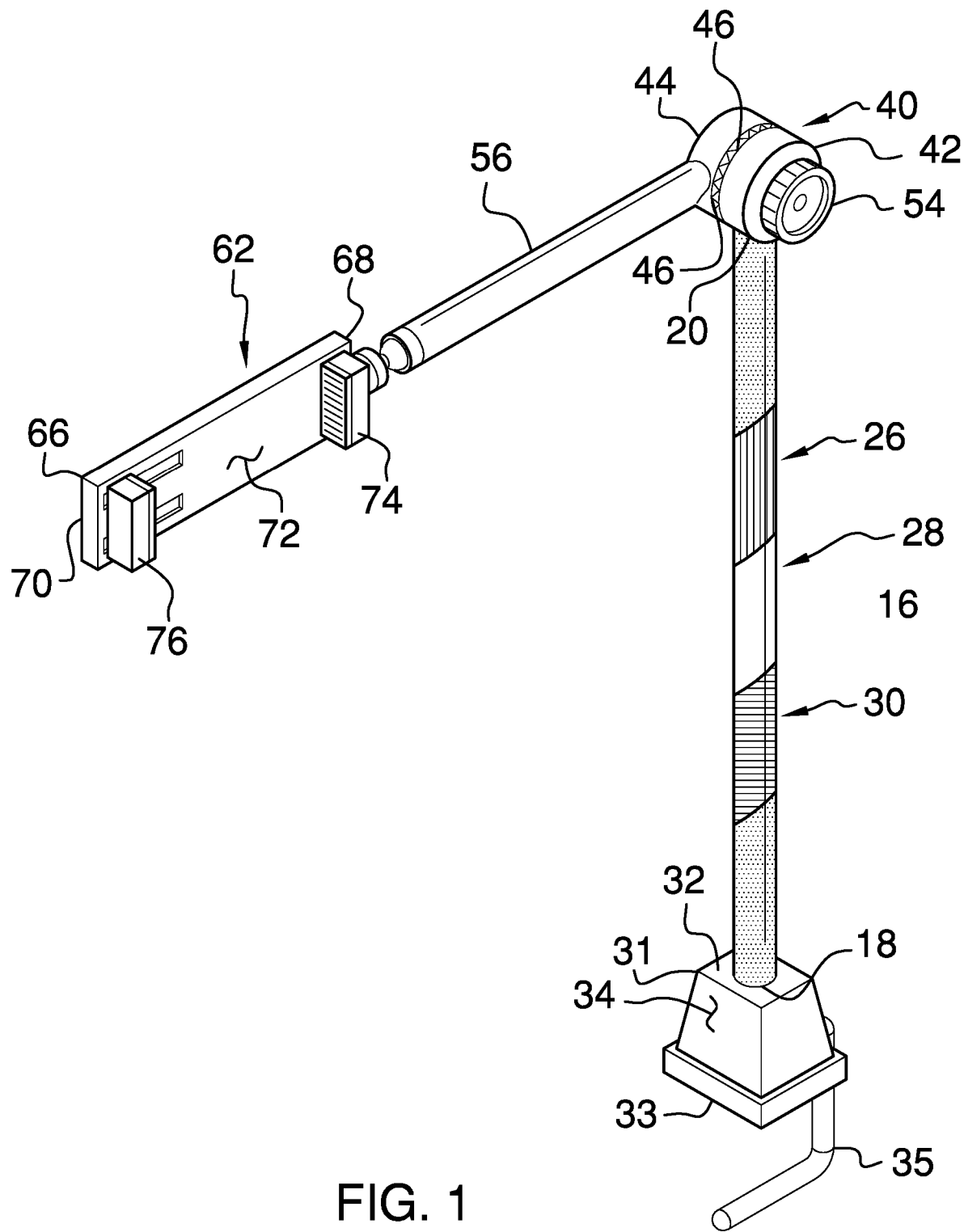
FIG. 1 is a perspective view of a smart phone holding assembly according to an embodiment of the disclosure.
Figure 2:
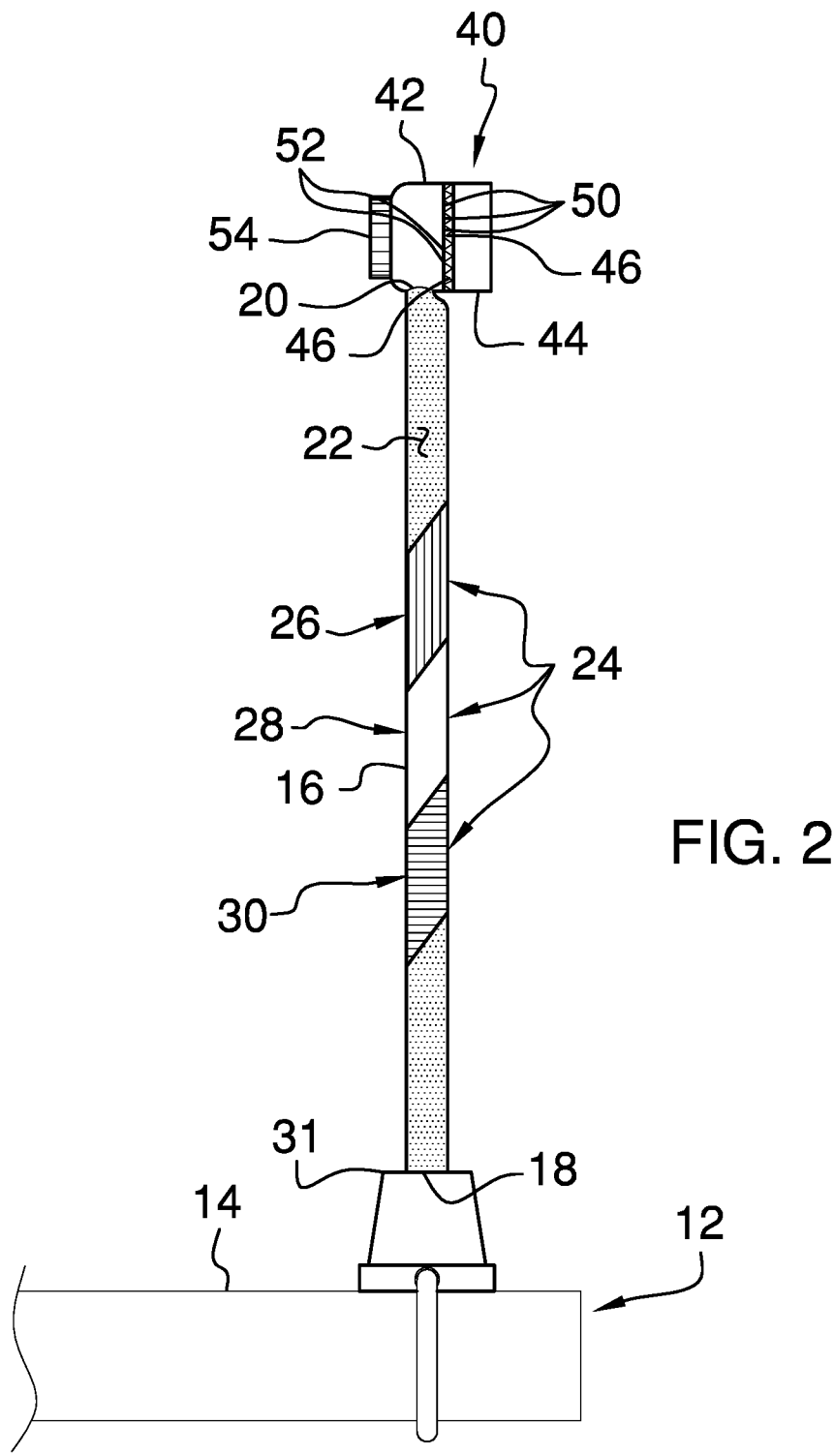
FIG. 2 is a right side view of an embodiment of the disclosure.
Figure 3:
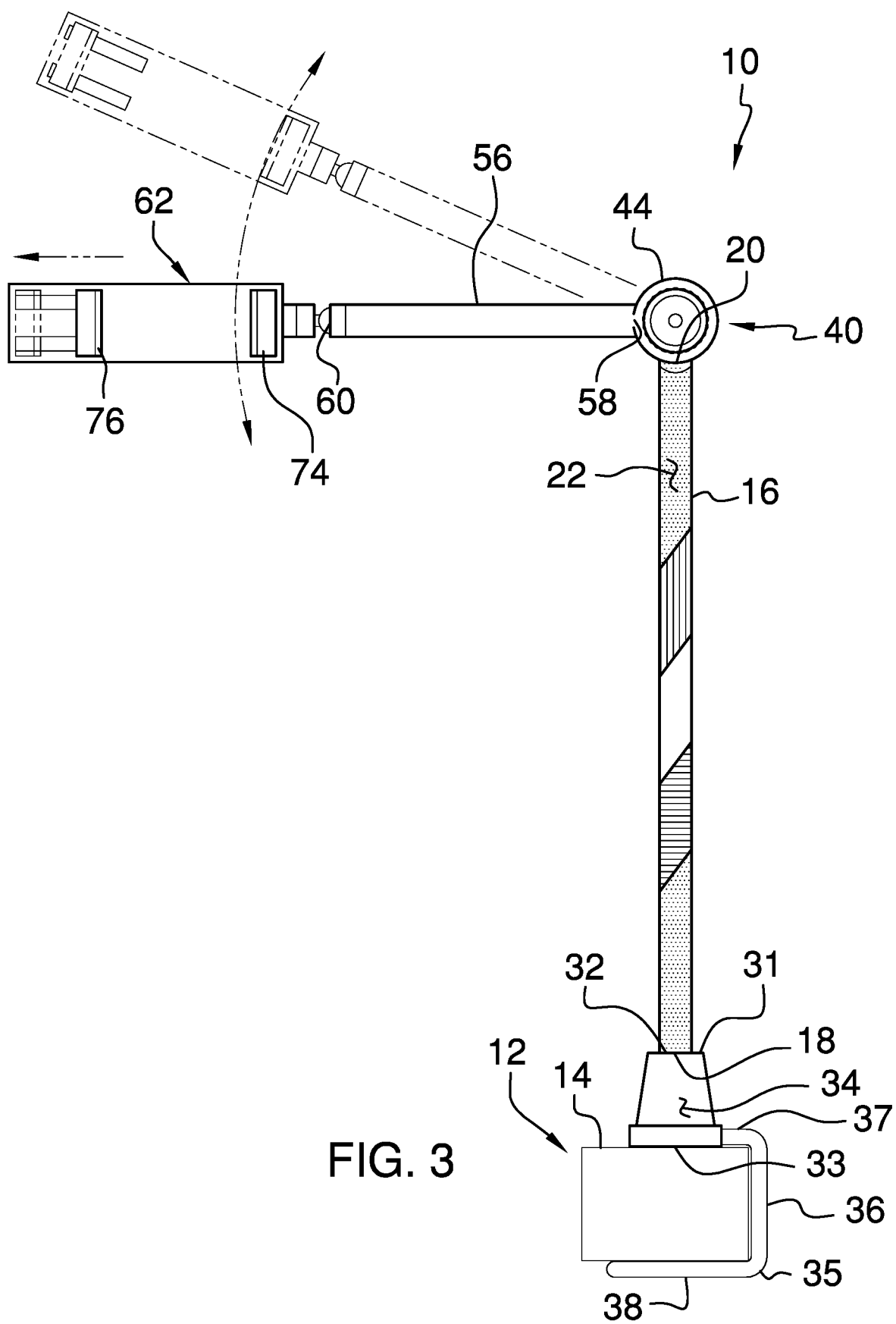
FIG. 3 is a front view of an embodiment of the disclosure.
Figure 4:
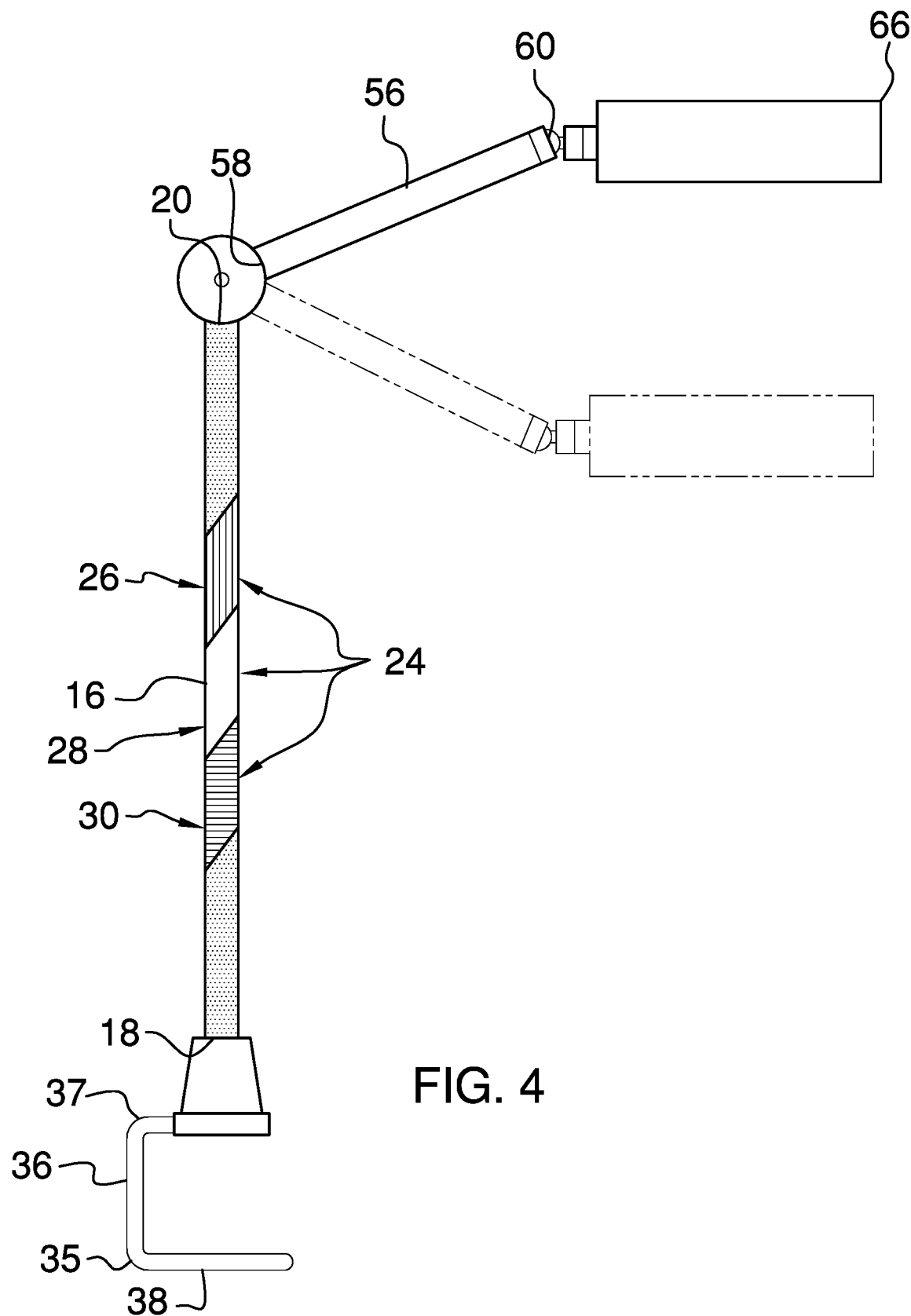
FIG. 4 is a back view of an embodiment of the disclosure.
Figure 5:
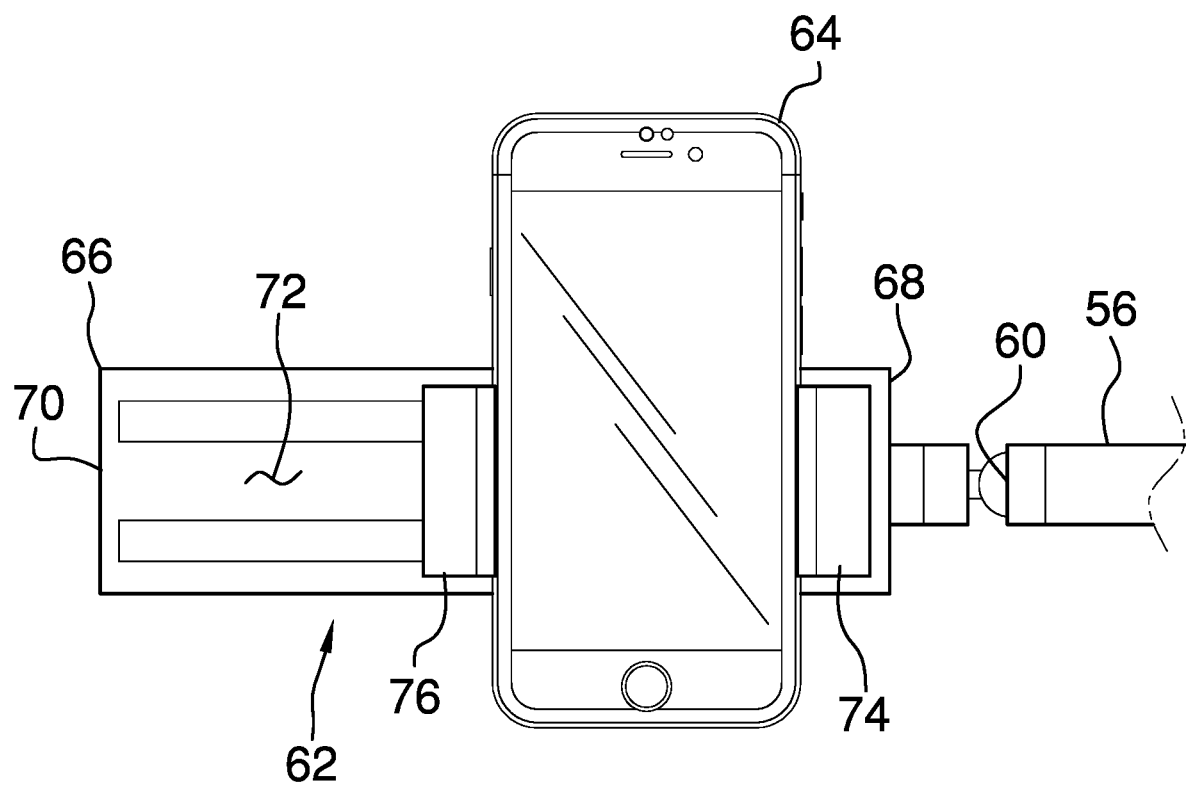
FIG. 5 is a perspective view of an electronic device clamped in a clamp of an embodiment of the disclosure.

With reference now to the drawings, and in particular to FIGS. 1 through 5 thereof, a new articulated holding device embodying the principles and concepts of an embodiment of the disclosure and generally designated by the reference numeral 10 will be described.

As best illustrated in FIGS. 1 through 5, the smart phone holding assembly 10 generally comprises a barber chair 12 that has an armrest 14. The barber chair 12 may be a barber chair of any conventional design commonly employed in a barber shop, a beauty salon and any other location offering haircuts, hair styles and other barber services. A first arm 16 is releasably coupled to the armrest 14. The first arm 16 has a first end 18, a second end 20 and an outer surface 22 extending therebetween. The outer surface 22 has a plurality of stripes 24 each extending therearound, and the stripes 24 are spaced apart from each other and are distributed between the first 18 and second 20 ends. Additionally, each of the stripes 24 wraps upwardly along the first arm 16. The plurality of stripes 24 includes a red stripe 26, a white stripe 28 and a blue stripe 30 for displaying the ornamental appearance of a barber pole.

A base 31 is included that has an upper end 32, a lower end 33 and an outside surface 34 extending therebetween. The outside surface 34 angles outwardly between the upper 26 and lower 28 ends such that the base 31 has a trapezoidal shape. The first end 18 of the first arm 16 is coupled to the upper end 32 of the base 31. The lower end 33 of the base 31 rests on the armrest 14 having the first arm 16 being vertically oriented on the armrest 14.

A retainer 35 is movably coupled to the base 31, and the retainer 35 includes a central member 36 extending between a first lateral member 37 and a second lateral member 38. The first 36 and second 38 lateral members are spaced apart from each other such that the retainer 35 has a C-shape. The first lateral member 37 is coupled to and extends laterally away from the outside surface 34 of the base 31 having the central member 36 extending downwardly from the base 31. The armrest 14 is compressed between the second lateral member 38 and the lower end 33 of the base 31 for retaining the base 31 on the armrest 14.

An articulating joint 40 is provided and the articulating joint 40 is coupled to the first arm 16. The articulating joint 40 has a first disk 42 that rotatably engages a second disk 44, and each of the first 42 and second 44 disks has an engaging surface 46 and an outwardly facing surface 48. The second end 20 of the first arm 16 is coupled to the outwardly facing surface 48 of the first disk 42. The engaging surface 46 of the first disk 42 has a plurality of detents 50 thereon and the engaging surface 46 of the second disk 44 has a plurality of teeth 52 thereon. Each of the teeth 52 releasably engages a selected one of the detents 50 when the second disk 44 is rotated thereby retaining the second disk 44 at a selected angle of rotating on the first disk 42.

A knob 54 is movably coupled to the first disk 42. The knob 54 spaces the engaging surface 46 of the second disk 44 away from the engaging surface 46 of the first disk 42 when the knob 54 is depressed. In this way the second disk 44 can freely rotate on the first disk 42. Additionally, the knob 54 is biased, via an internal spring or the like, to urge the second disk 44 toward the first disk 42. Thus, the teeth 52 engage the detents 50 when the knob 54 is not manipulated.

A second arm 56 is coupled to the articulating joint 40 such that the second arm 56 is positionable at a selected angle with respect to the first arm 16. The second arm 56 has a primary end 58 and a secondary end 60, and the primary end 58 is coupled to the outwardly facing surface 48 of the second disk 44. A clamp 62 is pivotally coupled to the second arm 56 such that the clamp 62 is positionable at a selected angle with respect to the second arm 56. The clamp 62 releasably engages an electronic device 64 to retain the electronic device 64 at eye level with a customer is seated in the barber chair 12. In this way the customer can keep their head positioned in the preferred orientation for receiving a haircut while the customer is viewing the electronic device 64. The electronic device 64 may be a Smartphone or other electronic device 64 that has an electronic display for viewing video or photos.

The clamp 62 comprises a panel 66 that has a first edge 68, a second edge 70 and a first surface 72 extending therebetween. The panel 66 is elongated between the first 68 and second 70 edges, and the first edge 68 is pivotally coupled to the secondary end 60 of the second arm 56. A first jaw 74 is coupled to and extends away from the first surface 72, and the first jaw 74 is aligned with the first edge 68. A second jaw 76 is slidably coupled to the first surface 72 and the second jaw 76 is slidable from the second edge 70 of the panel 66 toward the first jaw 74. In this way the second jaw 76 can compress the electronic device 64 between the first 74 and second 76 jaws. Additionally, the electronic device 64 can be retained in either a portrait orientation or a landscape orientation.

The first surface 72 may have a pair of slots 78 extending inwardly therein, and each of the slots 78 may extend from a point near the second edge 70 of the panel 66 toward the first edge 68 of the panel 66. The second jaw 76 may slidably engage each of the slots 78 for slidably coupling the second jaw 76 to the panel 66. Additionally, each of the first 74 and second 76 jaws may each include a cushion 80 that engages the electronic device 64. The cushion 80 on each of the first 74 and second 76 jaws may be comprised of a resiliently compressible material for enhancing gripping the electronic device 64.

In use, the base 31 is positioned on the armrest 14 of the barber chair 12 such that the retainer 35 engages the armrest 14 for retaining the first arm 16 in the vertical orientation. The knob 54 can be manipulated to position the second arm 56 at the selected angle with respect to the first arm 16 for positioning the clamp 62 at the customer's eye level when the customer sits in the barber chair 12. The electronic device 64 is clamped in the clamp 62 and the clamp 62 is manipulated on the second arm 56 to position the electronic device 64 at a selected orientation. Thus, the customer can view the electronic device 64 without having to look downwardly. In this way the customer's head is retained in the preferred orientation for receiving a haircut while the customer is viewing the electronic device 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A smart phone holding assembly being configured to position a smart phone at a viewing position during a haircut, said assembly comprising:
    a barber chair having an armrest;
    a first arm being releasably coupled to said armrest, said first arm having a first end, a second end and an outer surface extending therebetween, said outer surface having a plurality of stripes extending therearound, said stripes being spaced apart from each other and being distributed between said first and second ends, said plurality of stripes including a set of red stripes, a set of white stripes and a set of blue stripes wherein said plurality of stripes is configured to facilitate the ornamental appearance of a barber pole;
    an articulating joint being coupled to said first arm, said articulating joint having a first disk rotatably engaging a second disk, each of said first and second disks having an engaging surface and an outwardly facing surface, said second end of said first arm being coupled to said outwardly facing surface of said first disk, said engaging surface of said first disk having a plurality of detents thereon, said engaging surface of said second disk having a plurality of teeth thereon, each of said teeth engaging a selected one of said detents when said second disk is rotated thereby retaining said second disk at a selected angle of rotating on said first disk;
    a second arm being coupled to said articulating joint such that said second arm is positionable at a selected angle with respect to said first arm; and
    a clamp being pivotally coupled to said second arm such that said clamp is positionable at a selected angle with respect to said second arm, said clamp releasably engaging an electronic device wherein said second arm is configured to retain the electronic device at eye level with a customer being seated in said barber chair.

2. The assembly according to claim 1, further comprising a base having an upper end, a lower end and an outside surface extending therebetween, said outside surface angling outwardly between said upper and lower ends, said first end of said first arm being coupled to said upper end, said lower end resting on said armrest having said first arm being vertically oriented on said armrest.

3. The assembly according to claim 2, further comprising a retainer being movably coupled to said base, said retainer including a central member extending between a first lateral member and a second lateral member, said first and second lateral members being spaced apart from each other such that said retainer has a C-shape, said first lateral member being coupled to and extending laterally away from said outside surface of said base having said central member extending downwardly from said base, said armrest being compressed between said second lateral member and said lower end of said base for retaining said base on said armrest.

4. The assembly according to claim 1, further comprising a knob being movably coupled to said first disk, said knob spacing said engaging surface of said second disk from said engaging surface of said first disk when said knob is depressed thereby facilitating said second disk to freely rotate, said knob being biased to urge said second disk toward said first disk.

5. The assembly according to claim 4, wherein said second arm has a primary end and a secondary end, said primary end being coupled to said outwardly facing surface of said second disk.

6. The assembly according to claim 1, wherein:
said second arm has a primary end and a secondary end; and
said clamp comprises a panel having a first edge, a second edge and a first surface extending therebetween, said panel being elongated between said first and second edges, said first edge being pivotally coupled to said secondary end of said second arm.

7. A smart phone holding assembly being configured to position a smart phone at a viewing position during a haircut, said assembly comprising:
a barber chair having an armrest;
a first arm being releasably coupled to said armrest;
an articulating joint being coupled to said first arm;
a second arm being coupled to said articulating joint such that said second arm is positionable at a selected angle with respect to said first arm, said second arm has a primary end and a secondary end; and
a clamp being pivotally coupled to said second arm such that said clamp is positionable at a selected angle with respect to said second arm, said clamp releasably engaging an electronic device wherein said second arm is configured to retain the electronic device at eye level with a customer being seated in said barber chair, said clamp comprising
a panel having a first edge, a second edge and a first surface extending therebetween, said panel being elongated between said first and second edges, said first edge being pivotally coupled to said secondary end of said second arm,
a first jaw being coupled to and extending away from said first surface, said first jaw being aligned with said first edge, and
a second jaw being slidably coupled to said first surface, said second jaw being slidable from said second edge of said panel toward said first jaw wherein said second jaw is configured to compress the electronic device between said second and first jaws.

8. A smart phone holding assembly being configured to position a smart phone at a viewing position during a haircut, said assembly comprising:
a barber chair having an armrest;
a first arm being releasably coupled to said armrest, said first arm having a first end, a second end and an outer surface extending therebetween, said outer surface having a plurality of stripes extending therearound, said stripes being spaced apart from each other and being distributed between said first and second ends, said plurality of stripes including a set of red stripes, a set of white stripes and a set of blue stripes wherein said plurality of stripes is configured to facilitate the ornamental appearance of a barber pole;
a base having an upper end, a lower end and an outside surface extending therebetween, said outside surface angling outwardly between said upper and lower ends, said first end of said first arm being coupled to said upper end, said lower end resting on said armrest having said first arm being vertically oriented on said armrest;
a retainer being movably coupled to said base, said retainer including a central member extending between a first lateral member and a second lateral member, said first and second lateral members being spaced apart from each other such that said retainer has a C-shape, said first lateral member being coupled to and extending laterally away from said outside surface of said base having said central member extending downwardly from said base, said armrest being compressed between said second lateral member and said lower end of said base for retaining said base on said armrest;
an articulating joint being coupled to said first arm, said articulating joint having a first disk rotatably engaging a second disk, each of said first and second disks having an engaging surface and an outwardly facing surface, said second end of said first arm being coupled to said outwardly facing surface of said first disk, said engaging surface of said first disk having a plurality of detents thereon, said engaging surface of said second disk having a plurality of teeth thereon, each of said teeth engaging a selected one of said detents when said second disk is rotated thereby retaining said second disk at a selected angle of rotating on said first disk;
a knob being movably coupled to said first disk, said knob spacing said engaging surface of said second disk from said engaging surface of said first disk when said knob is depressed thereby facilitating said second disk to freely rotate, said knob being biased to urge said second disk toward said first disk;
a second arm being coupled to said articulating joint such that said second arm is positionable at a selected angle with respect to said first arm, said second arm having a primary end and a secondary end, said primary end being coupled to said outwardly facing surface of said second disk; and
a clamp being pivotally coupled to said second arm such that said clamp is positionable at a selected angle with respect to said second arm, said clamp releasably engaging an electronic device wherein said second arm is configured to retain the electronic device at eye level with a customer being seated in said barber chair, said clamp comprising:
a panel having a first edge, a second edge and a first surface extending therebetween, said panel being elongated between said first and second edges, said first edge being pivotally coupled to said secondary end of said second arm;

a first jaw being coupled to and extending away from said first surface, said first jaw being aligned with said first edge; and a second jaw being slidably coupled to said first surface, said second jaw being slidable from said second edge of said panel toward said first jaw wherein said second jaw is configured to compress the electronic device between said second and first jaws.

* * * * *